March 25, 1952 L. CAIM 2,590,678
PHOTOGRAPHIC ROLL FILM
Filed March 4, 1949
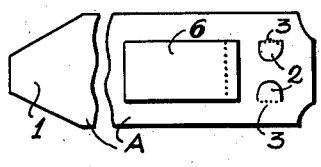
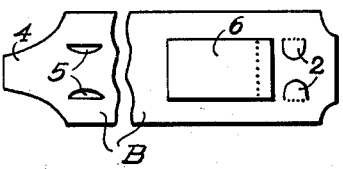
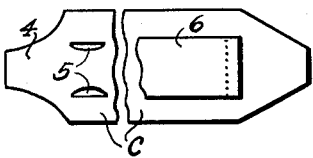
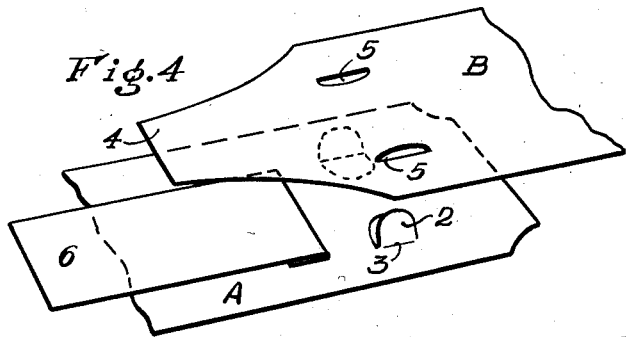
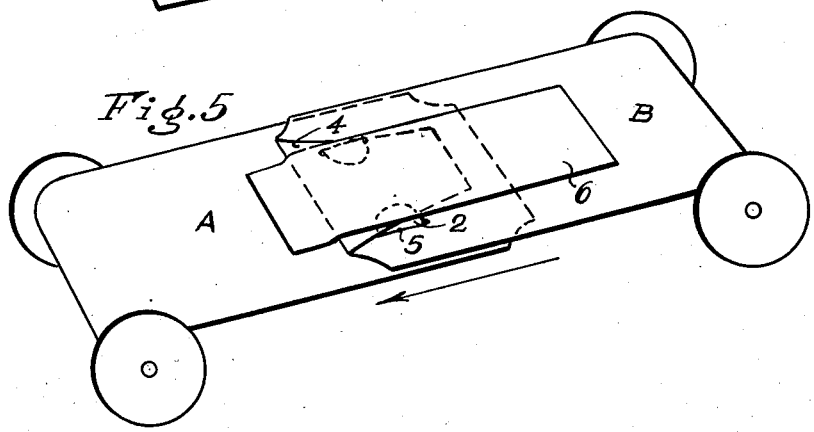
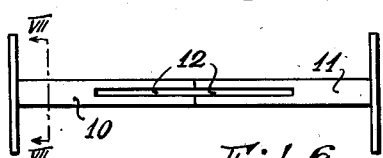
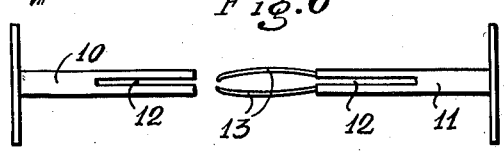
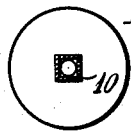
INVENTOR.
Louis CAIM
BY
Attorney.

Patented Mar. 25, 1952

2,590,678

UNITED STATES PATENT OFFICE 2,590,678

PHOTOGRAPHIC ROLL FILM

Louis Caim, Jerusalem, Palestine

Application March 4, 1949, Serial No. 79,529

2 Claims. (Cl. 95—9)

Every amateur photographer knows that a roll film can practically be developed only after having had it exposed on its whole length, i. e. after all pictures for which it is destined, have been taken. To be sure, one can always cut off part of a film and develop it, but this is obviously a complicated matter, since it has to be done in a dark room, not always at the disposal of the amateur.

It is the object of the present invention to provide a roll film which can be inserted into a camera as a whole but which can be withdrawn in parts, so that each part, after being exposed, can be developed independently from the other parts which may remain in the camera for further use.

It is a further object of the invention to provide a spool which facilitates the use and manipulation of the new film.

The invention will now be described with reference to the annexed drawings, showing in Figs. 1, 2 and 3 subsequent parts of the new film, in Fig. 4 details of the end portions of these parts and in Fig. 5 a pair of spools with the new film wound thereon. Fig. 6 shows the new spool and Fig. 7 is a section on line VII—VII of Fig. 6.

The usual covering strip of black paper in the new film consists of several parts, each having the usual overlength at both ends. The first part A, Fig. 1 has the usual tongue 1 with which it engages the longitudinal slot in the axle of the wind-up spool. At the opposite end of this paper strip, there are punched from the strip two flaps 2, 2 of semicircular shape, which can be bent through 90° about a line 3. The next part B, Fig. 2 of the covering paper has a tapering end part 4, similar to tongue 1; at a small distance therefrom there are provided two parallel longitudinal slits 5, 5. At the opposite end of the strip B there are again flaps 2, 2. Only one strip B is shown, but there may be more than one, all of which will be called "intermediary" strips. Finally, there is the last part C (Fig. 3) of the covering paper. It also has a tapering end 4 and slits 5. To each of these paper strips is stuck a piece of gummed paper near flaps 2, and in the case of strip C near its extreme end, as usual with roll films. These paper pieces are marked 6. To each of strips A, B and C is stuck a piece of light sensitive film, in the ordinary manner. Strips A, B and C serve as carriers and cover for the film strips, as is well known with roll films.

All these strips A, B (any number thereof) and C may be connected in a consecutive row by means of the described flaps and slits to form a length of roll film: The flaps 2 of strip A are bent to extend in a right angle from strip A. Then slits 5 of strip B are passed over the flaps which are again folded flat. Then the tapering end portion 4 of strip B is folded double to lie over the flaps 2 passed through slits 5. Finally paper 6 is laid over the folded part 4. This manipulation and the final position will be easily understood from Figs. 4 and 5. The connection between a strip B and a strip C is performed in an analogous manner.

In use of such a composite film, its parts having thus been connected, the tongue 1 is passed through the slot in the axle of a wind-up spool and in the same way the tongue of part C is passed through the slot in the axle of the supply spool. This position can be seen in Fig. 5, the just described connection, as seen in Fig. 5, will in no way interfere with the smooth running of the film. On the other hand, the various parts of the film can be detached from each other by lifting paper 6, folding back end portion 4 and lifting the strip with slits 5 (either a strip B or C) from the flaps 2. In that case, the forward part together with the spool may be removed from the camera and the subsequent part fixed to a new empty wind-up spool by passing the tapering end portion 4 through the slot of the spool. Thus, always one part A and one part C is necessary, but there may be several parts B. To each of these parts is affixed a film strip for two, three or four exposures. As after the withdrawal of a film part with the spool, a new spool has to be provided for the subsequent part, the photographer will have to carry with him several reserve spools. In order to obviate this inconveniency, I have devised a special spool which can be detached from the withdrawn film part for reinsertion into the camera, so that the subsequent film part can be attached to it with its forward end.

The new spool is shown in Figs. 6 and 7. It consists of two parts 10, 11. The axle portion of each part is slotted at 12, so that in the assembled position of the spool, the conventional slot is obtained. One of the spool parts is provided with two springy prongs 13 extending in the direction of the axle. These prongs enter into the other, hollow axle part and by their springiness hold the two parts together. Whenever a film part on the spool is withdrawn from the camera, is wound fast and is secured by the gummed strip 6, the spool can be removed by detaching its two parts from each other. In order that this may be easily done, the axle has a square cross section (see Fig. 7) which facilitates its withdrawal from the tightly fitting film windings. The film roll, as a whole, will be—due to the greater length of the overlapping cover strip—of greater thickness than the normal film roll of same size. It is therefore advisable to have this composite film roll wound on the thinner type of the conventional spool.

Parts A and B may of course be equal, i. e. a part B may equally well serve as a part A, these parts differing only in the omission of slits 5 in parts A.

What I claim is:

1. A roll film comprising a multiple number of covering paper strips, the same number of light sensitive film strips, shorter than the paper strips being stuck to the paper strips in the conventional manner, all strips being arranged in a consecutive order to form a camera film, tongues at the outer ends of the two extreme paper strips for engagement with the slots in the film spools, a tapering end portion at one end of each intermediate paper strip and at the inner end of the last paper strip, each of said intermediate paper strips and said last paper strip being provided near its tapering end with a pair of slits, two flaps being punched out of the paper strips near the end opposite the tapering end portions of the intermediate strips and near the inner end of the first paper strip for engagement with the slits near the ends of each consecutive strip, the tapering end portions being folded back over the flaps passed through the slits and bent into locking position, and strips of gummed paper stuck at one of their ends to the paper strips from which the flaps extend and being laid over the folded tapering end portions.

2. In a roll film as claimed in claim 1, the slits of a pair of strips being parallel to each other and extending in the direction of the longitudinal axis of the paper strip.

LOUIS CAIM.

REFERENCES CITED

The following references are of record in the file of this patent:

UNITED STATES PATENTS

| Number | Name | Date |
| --- | --- | --- |
| 661,504 | Ehlman | Nov. 13, 1900 |
| 727,283 | Cady | May 5, 1903 |
| 1,160,037 | Brewer | Nov. 9, 1915 |
| 1,212,137 | Gindele | Jan. 9, 1917 |
| 1,321,067 | Meyering | Nov. 4, 1919 |
| 1,524,508 | Cohen | Jan. 27, 1925 |
| 1,854,102 | Buholzer | Apr. 12, 1932 |
| 1,969,858 | Schnitzler | Aug. 14, 1934 |
| 2,005,405 | Wittel | June 18, 1935 |